US012767287B2

(12) United States Patent
Boon et al.

(10) Patent No.: US 12,767,287 B2
(45) Date of Patent: Oct. 20, 2026

(54) OFFSHORE FLOATER AND A RELATED OFFSHORE FLOATER PLANT

(71) Applicant: TRACTEBEL ENGINEERING, Brussels (BE)

(72) Inventors: Tine Boon, Brussels (BE); Caroline Tjengdrawira, Brussels (BE); Cedric Dewandre, Brussels (BE)

(73) Assignee: SEAVOLT BV, Wolvertem (BE)

(*) Notice: Subject to any disclaimer, the term of this patent is extended or adjusted under 35 U.S.C. 154(b) by 321 days.

(21) Appl. No.: 18/291,696

(22) PCT Filed: Jul. 27, 2022

(86) PCT No.: PCT/EP2022/071034
§ 371 (c)(1),
(2) Date: Jan. 24, 2024

(87) PCT Pub. No.: WO2023/006800
PCT Pub. Date: Feb. 2, 2023

(65) Prior Publication Data
US 2025/0091696 A1 Mar. 20, 2025

(30) Foreign Application Priority Data
Jul. 28, 2021 (BE) .................................. 2021/5596

(51) Int. Cl.
*B63B 35/44* (2006.01)
*H02S 20/30* (2014.01)

(52) U.S. Cl.
CPC .............. *B63B 35/44* (2013.01); *H02S 20/30* (2014.12); *B63B 2035/4453* (2013.01)

(58) Field of Classification Search
CPC .. B63B 35/44; B63B 2035/4453; H02S 20/30
See application file for complete search history.

(56) References Cited

U.S. PATENT DOCUMENTS

| | | | | |
|---|---|---|---|---|
| 7,963,241 | B2 * | 6/2011 | Srinivasan .......... | B63B 35/4413 114/267 |
| 2012/0025369 | A1 | 2/2012 | Kao et al. | |

FOREIGN PATENT DOCUMENTS

| | | | |
|---|---|---|---|
| CN | 109278950 | A | 1/2019 |
| FR | 2408512 | A1 | 6/1979 |

(Continued)

OTHER PUBLICATIONS

International Search Report and Written Opinion for PCT Application No. PCT/EP2022/071034, dated Oct. 11, 2022, 9 pages.

(Continued)

*Primary Examiner* — Sabbir Hasan
(74) *Attorney, Agent, or Firm* — Dickinson Wright PLLC

(57) ABSTRACT

The present disclosure relates to an offshore floater and a related offshore floater plant where the offshore floater is configured for positioning a deck above sea-level and the offshore solar floater comprising a floating structure for providing buoyancy to the offshore floater and a deck for mounting the plurality of solar panels, the deck being supported by the floating structure, where the floating structure comprises a plurality of vertical buoyancy columns positioned at corners of the floating structure and a plurality of structural braces connecting the plurality of vertical buoyancy columns for providing structural stability of the floating structure.

14 Claims, 3 Drawing Sheets

(56) References Cited

FOREIGN PATENT DOCUMENTS

| | | | | |
|---|---|---|---|---|
| JP | 04129895 | A | 4/1992 | |
| JP | H04197887 | A | 7/1992 | |
| KR | 20120125105 | A | 11/2012 | |
| KR | 102085864 | B1 | 3/2020 | |
| WO | WO-2012026883 | A2 * | 3/2012 | ............. B63B 35/38 |

OTHER PUBLICATIONS

International Preliminary Report on Patentability for PCT Application No. PCT/EP2022/071034, dated Oct. 11, 2023, 10 pages.
European Patent Office Examination Report for Application No. 22 751 109.4 dated Dec. 10, 2025 (3 Pages).
UAE Ministry of Economy & Tourism Office Action Summary for Application No. P60001752024 dated Feb. 20, 2026 (6 Pages).

* cited by examiner

OFFSHORE FLOATER AND A RELATED OFFSHORE FLOATER PLANT

CROSS-REFERENCE TO RELATED APPLICATION(S)

This present application is a national stage application of International Patent Application No. PCT/EP2022/071034, filed Jul. 27, 2022, which claims priority to Belgium Patent Application No. 2021/5596, filed Jul. 28, 2021, the disclosures of which are hereby incorporated by reference in their entireties.

TECHNICAL FIELD

The present disclosure relates to a solar floater for positioning a deck above water-level and a related solar energy generating system.

BACKGROUND

Currently, known solar plants placed on water to harness sunlight into electricity consist of one or more solar floaters for positioning a deck above water-level where such solar floater comprising a floating structure for providing buoyancy to such solar floater, and a deck for positioning a load such as solar panels where such deck being carried by the floating structure.

In a water-based photovoltaic device comprising a solar module for receiving sunlight and converting it into electricity and a floating structure for installing the solar module on the water, the lower portion of the floating structure is submerged in water and the remaining upper portion floats on the water, i.e. a Semi-submersible type.

Such solar plant and corresponding floater typically are characterized by a low floater and relative small scale floater design to be as little susceptible to wind as possible, while at the same time positioned sufficiently high so as to not be submerged in the water. Such design aims to prevent the deck from being submerged by water due to higher/increased wind strength, events that could lead to the damage of the solar installation positioned on the deck. These known types of solar plants and corresponding floaters are thus not suited for being positioned in offshore water conditions with a chance of higher waves and higher wind speed.

WO 2012/026883 A2 discloses a modular floating platform for deploying renewable energy converters on a body of water. The modular platforms may be connected to other modular platforms to form bigger structures. Each modular platform may have multiple types of renewable energy converters installed on the platform. Furthermore, each platform is designed to allow current and wave to pass through the platform structure. Each platform may also be configured to allow air and sunlight to pass through the structure to the underlying water surface.

KR 102 085 864 B1 further discloses an offshore floating structure for photovoltaic generation. The offshore floating structure comprises: a semi-submersible floating structure body (10) including a plurality of standing columns distanced from each other at predetermined intervals and floating while being erected with respect to the surface of the sea, and a plurality of connecting rods connecting the standing columns; solar panels (20) installed at an upper portion of the floating structure body protruded upward at a predetermined height outside the surface of the sea; and mooring cables (30) having upper end portions connected to the bottom surfaces of the standing columns and lower end portions fixed to the sea bed. Therefore, the entire structure is formed by using, as a standing column structure, a unit floating body forming a basic unit, to fundamentally minimize a waterplane area between the unit floating body and the surface of the sea and minimize the shaking of the offshore floating structure due to waves to perform stable photovoltaic generation, thereby increasing power generation efficiency.

JP H04197887 A further discloses a hull, constituted by four hollow circular column like buoyant bodies and a deck plate 2 supported on the tops thereof. An anchor body B has four anchor blocks 3 and a tendon C is stretched between each buoyant body 1 and the corresponding anchor block 3. A buoyancy adjusting chamber 8 is located under a tendon attaching chamber 5 of the buoyant body 1 so as to enable injection/discharge of a ballast water. Waiting for fall of the tidewater level, the height of a tendon stopper 9 is lifted up to a height level at the time of a low tidewater level, whereby slack of the tendon C is eliminated by rise of the hull A when a high tidewater level is reached. While draw-off of the ballast water 21 is next commenced, the speed of this draw-off is so set that the rising speed of the hull A resulting from buoyancy increase may be higher than the falling speed thereof resulting from the tidewater level decrease.

SUMMARY

An object of embodiments of the present disclosure is to provide an offshore floater of the above known type but wherein the aforementioned shortcoming or drawbacks of the known solutions are alleviated or overcome.

In particular, the objective is to provide with a solar plant and corresponding solar floater suitable for the offshore environment which is able to withstand extreme waves up to the height of 11 meters and extreme wind speeds exceeding 30 m/s while preventing damage to such power plant by submersion of water.

Accordingly, embodiments of the present disclosure relate to an offshore floater for a plurality of solar panels, said offshore floater comprising:

- a floating structure for providing buoyancy to said offshore floater; and
- a deck for mounting said plurality of solar panels, said deck being supported by said floating structure, wherein said floating structure comprises:
- a plurality of vertical buoyancy columns positioned at corners of said floating structure; and
- a plurality of structural braces connecting said plurality of vertical buoyancy columns for providing structural integrity of said floating structure; and wherein said length of each said vertical buoyancy column lies in a range between 4 and 25 meter, preferably between 10 and 25 meter, more preferably between 10 and 20 meter.

Still another embodiment of the present disclosure relates to the offshore floater, wherein said plurality of structural braces between said vertical buoyancy columns of said plurality of vertical buoyancy columns are positioned substantially horizontal.

Still another embodiment of the present disclosure relates to the offshore floater, wherein said plurality of structural braces are positioned along the outer perimeter of said floating structure.

A further embodiment of the present disclosure relates to the offshore floater, wherein said deck extends beyond said floating structure.

Still a further embodiment of the present disclosure relates to the offshore floater, wherein said floating structure is elevated at least 1,5 over the over the sea level including extreme wave, or could be emerging 9 m or more above still sea level.

A further embodiment of the present disclosure relates to the offshore floater, wherein said length of said deck lies in a range between 25 and 75 m, and preferably between 30 and 60 m, more preferably between 35 and 40 m and a width of said deck lies in a range between 25 and 75 m, and preferably between 30 and 60 m, more preferably between 35 and 40 m.

Another embodiment of the present disclosure relates to the offshore floater, wherein said floating structure comprises said plurality of vertical buoyancy columns comprises concrete, steel, Glass reinforced plastic, Fiber reinforced plastic, aluminum, composite or a combination thereof.

Still another embodiment of the present disclosure relates to the offshore floater, wherein the exterior of said floating structure of said offshore floater is covered with an anti-corrosion coating.

Still another embodiment of the present disclosure relates to an offshore floater (OF1), wherein the deck is arranged for mounting the plurality of solar panels in a triangular wave shaped roof set-up.

Still another embodiment of the present disclosure relates to the offshore floater OF1, wherein said offshore solar floater at least comprises an electrical inverter for delivering and evacuating the generated electrical current.

Still another advantageous embodiment of the present disclosure relates to an Offshore floater plant wherein said offshore floater plant comprises a plurality of offshore floaters according to any of the above embodiments, wherein each of said offshore floaters of said plurality of offshore floaters is coupled by means of a flexible connections; and in that at least said offshore floaters positioned at the corner of said offshore floater plant are attached to the bottom of the water.

Indeed, this objective is achieved by an offshore floater for positioning a plurality of solar panels on a deck above sea-level where the offshore solar floater comprises a floating structure consisting of a plurality of vertical buoyancy columns positioned at the extremities of said floating structure where these vertical buoyancy columns are positioned in a vertical configuration relative to the water surface and the floating structure further comprises a plurality of structural braces which are coupled between said vertical buoyancy columns of said plurality of vertical buoyancy columns for providing structural integrity of said floating structure where the floating structure is dimensioned such that the deck of the offshore solar floater is positioned sufficiently high not to have the plurality of solar panels positioned on the deck of said floating structure be submerged with water.

As the volume and dimensions of the part of the plurality of vertical buoyancy columns submerged in the water needs to be dimensioned in such manner that this volume and dimensions provides sufficient buoyancy to maintain the required distance between the deck and water surface, the length of each said vertical buoyancy column lies in a range between 4 and 25 m, more preferably 10 and 25 m. Even more preferably this length lies between 10 and 20 m. The diameter of such vertical buoyancy column is to be dimensioned in function of the material used, to be able to be obtain sufficient buoyancy, stability, and clearance distance for the solar panels position on the deck of the floater.

By positioning each of the plurality of vertical buoyancy columns at the extremities of said floating structure where these vertical buoyancy columns are further positioned in a vertical configuration relative to the water, the stability characteristics of the floater and hence the stability of the offshore solar floater is increased significantly, due to the fact that the buoyancy is more distributed towards the extremities of the floater structure.

The buoyancy being distributed towards the extremities of the floater structure means that the distance between the centre of such floater and the buoyancy columns is as large as possible. The distance between the centre of such floater and a corner of such floater where such corner is constituted by a vertical buoyancy column is largest. By positioning such vertical buoyancy columns at the extremities of such floater the stability of such floater is optimum.

A floater with a more uniform or more centred buoyancy distribution, e.g. comprising vertical buoyancy columns on the inner part of such floater, or in between vertical buoyancy columns at respective corners, offers less stability compared to a floater with a more buoyancy distribution towards the extremities.

Furthermore, the buoyancy of a floater, according to embodiments of the present disclosure, is essentially provided through the vertical buoyancy columns, while the connection braces have as primary role to provide structural integrity but not to provide buoyancy, where the lesser or absence of a buoyancy function of the connection braces also improves the stability of the offshore floater.

In designing such a floating structure, the number of vertical buoyancy columns is, amongst others, a trade-off between the buoyancy and stability of the floating structure and cost as a consequence of the amount of material used and complexity in addition to the production costs.

Such offshore solar floater is to be dimensioned so that the floater is constructed in such a way that the solar panels position on the deck of the offshore floater, in an offshore application, is prevented from submerging by waves of water.

Moreover, by applying structural braces, amongst others between said vertical buoyancy columns of said plurality of vertical buoyancy columns, the structural integrity of the floating structure is ensured without affecting the buoyancy of the floating structure considerably.

The primary function of the structural braces is to ensure structural integrity. By using smaller diameters for the structural braces than for the buoyancy columns, it is ensured that the floater buoyancy is concentrated in the vertical buoyancy columns rather than in the structural braces, and that the floater thereby has a buoyancy distributed towards the extremities ensuring a better stability, as explained above.

Furthermore, the floating structure is dimensioned in such manner that the deck of the offshore solar floater has sufficient vertical clearance above and thus not be submerged in the water, where the length of the non-submerged part of the vertical buoyancy columns indicates the vertical clearance for the load of the offshore floater. The deck of the offshore solar floater is positioned sufficiently high not to be submerged in water if the floating structure is elevated at least 1.5 meter above the water level including selected extreme wave. In other words the vertical clearance should be at minimum 1,5 m from the selected extreme wave water level surface, meaning the deck of the offshore solar floater could be emerging 9 m or more above still sea level without considering marine growth at end of operational life.

The vertical buoyancy columns are partially submerged in the water. The submerged parts of each vertical buoyancy column together bear the weight of the entire offshore solar floater while the length of the non-submerged part indicates the distance between the deck of the offshore solar floater and the sea level where this distance should be minimum 1,5 m in case bad weather such as of heavy storms, tornado's.

The load positioned or mounted on the deck, e.g. Solar panels optionally with power conversion equipment such as solar inverters and transformers and/or batteries needs to be protected against contact with sea water to prevent from damage due the sea water.

Important characteristics of such an offshore solar floater are the number of vertical buoyancy columns, the buoyancy mainly provided by the vertical buoyancy columns compared to the structural braces, and solar panel area larger than the floater footprint to obtain the objective of having a high power production, and an optimized design assuring a sufficient vertical clearance for the solar panels in respect to the waves, further resulting in less material, less fabrication complexity, increased stability and a higher energy production.

Embodiments of the present disclosure are enabled to accommodate offshore environment conditions, including continuous wave loads inducing fatigue (which for instance is not the case for onshore floaters, where significant waves essentially occur during extreme events (such as storms)) requiring an appropriate dimensioning of floater according to embodiments of the present disclosure to prevent from fatigue of material. As a consequence of this, materials need to be selected that have an appropriate behavior against fatigue loads. This means that HDPE (high density poly ethylene) or similar which is conventionally used for onshore floating modules is not suitable for use in embodiments of the offshore floater according to the present disclosure.

Another significant advantageous effect of this design is that the smaller total surface of submerged material of the floating structure results in less marine organism growth which is characteristic of an offshore/marine floater, and as a consequence, less additional weight of such floating structure over time due to the marine organism growth. Hence, reciprocally, there is a reduced amount of marine organism growth that could increase the load over time to be accounted for in the design of the floater and the related required buoyancy. This impact can be considerable. Having said this, as part of design life, an extent of additional weight of marine organism growth on the floater surfaces has been taken into account in the design of the floater structure, as per design requirements of all marine structures.

"Offshore" conditions apply in case of water bodies with high wave conditions (above 2 meters) such as can be found in marine environmental conditions. These include seas, oceans, and can include large lakes if they exhibit the same wave and/or wind conditions as previously described. This typically concerns salty water bodies, but could also concern sweet water bodies, in case of lakes with high wave conditions.

"Onshore" conditions on the other hand apply in case of water bodies with limited environmental conditions, in particular limited wave conditions (until approximately 2 meters). This includes inland waters, enclosed water bodies, lakes, and rivers, insofar wave conditions are limited. It could also be water bodies in nearshore areas or water bodies contact with the sea but sheltered, such as bays, lagunas or ports, in such a way that they have environmental conditions similar to inland waters, i.e. limited waves.

According to an embodiment of the present disclosure the offshore floater wherein the plurality of structural braces between said vertical buoyancy columns of said plurality of vertical buoyancy columns are positioned horizontally (or diagonally if so required) between the buoyancy columns. In this way optimum structural integrity is ensured to the offshore solar floater.

According to a further embodiment of the present disclosure the plurality of structural braces are positioned, amongst others between the buoyancy columns of said floating structure to provide with structural stability of the floater.

According to a further embodiment of the present disclosure the offshore floater, the deck of the offshore floater extends beyond said floating structure. In this way the space for positioning a plurality of solar panels is extended to increase the number of solar panels to be mounted and thus increasing the electricity production. Such a deck of a floater according to embodiments of the present disclosure could provide space for at least 300 solar panels on one single floater, but possibly substantially more.

According to an embodiment of the present disclosure the length of said deck lies in a range between 25 and 75 m, and preferably between 30 and 60 m, more preferably between 34 and 40 m and a width of said deck lies in a range between 25 and 75 m, and preferably between 30 and 60 m, more preferably between 34 and 40 m.

For instance, a deck of 35×35 meter deck could allow to position approximately 450 solar panels.

The deck of such offshore floater extends up to 5 meters horizontally beyond the said floating structure. The effect of this is that the available surface area doubles, making it possible to install twice as much solar panels as without the extension beyond the said floating structure. This brings a huge advantage in terms of solar panel installed capacity for a given offshore floater.

An Offshore floater plant is constituted by offshore floaters that are coupled to each other by means of flexible connection lines (such as mooring lines). These flexible connections lines enable the offshore floater to benefit from freedom of motion, however keeping the same average horizontal position. These flexible connection lines enable a vertical freedom of motion in function of the wave environment. This freedom of motion is also permitted by the fact that the offshore floaters are positioned at some distance from each other. This freedom of motion makes that the loads between each floater are very much reduced, compared to floaters with rigid connections where these floaters have to follow the movements of the neighboring floaters besides its own loads induced by the waves, such a floater cannot follow the movements of the waves independently, thus inducing high and complex loads, making these rigid connections very critical and subject to these high and complex loads.

In the situation of rigid connections, these rigid connections would have to be located at or near the deck or in the upper part of the floater. Another advantage of the choice of flexible connections lines between floaters together with sufficient distance between each floater, is that no such high or dynamic loads are applied on the deck and that this deck can therefore be extended beyond the said offshore floater. As is further explained in this document, the possibility to extend the deck beyond the said offshore floater brings a huge advantage in terms of increased available space per offshore floater and thus increased installed capacity of PV solar panels per offshore floater.

According to a further embodiment of the present disclosure the offshore (solar) floater, the floating structure is elevated at least 1,5 m over the over the sea level.

In other words the vertical clearance should be at minimum 1,5 m from the selected extreme wave water level surface, meaning the deck of the offshore solar floater could be emerging 9 m or more above still sea level, without considering marine growth at end of operational life.

According to another embodiment of the present disclosure the offshore floater, the floating structure of said offshore solar floater is designed to be corrosion-proof, achieved either by using non-metallic material, or by application of anti-corrosion coating on metallic structural components. In this way the material of the offshore (solar) floater is protected adequately against the influence of the (salt) water in order to ensure its operational life in the offshore environment.

According to another embodiment of the present disclosure the offshore floater, said offshore solar floater may include power conversion system for delivering and evacuating the generated electrical current.

Embodiments of the present disclosure aim at keeping PV panels away from seawater, in order to be able to use conventional PV panels. By using conventional solar panels, these solar panels can be applied in large scale requiring security and certainty of electricity production. The use of conventional and proven solar panels, also enables a low maintenance vision, which is important for an offshore environment where maintenance and access is more difficult than onshore. It can possibly be furthermore enabled to make the energy generation by means of these solar panels autonomous by applying further electrical equipment on the floaters (such as inverter and/or transformers).

According to a still further embodiment of the present disclosure the offshore floater the floating structure and the belonging plurality of vertical buoyancy columns may comprise concrete, steel, aluminum, Fiber reinforced plastic (FRP), Glass reinforced plastic (GRP), composite, or similar, or a combination thereof.

Embodiments of the present disclosure are enabled to accommodate offshore environment conditions, including continuous wave loads inducing fatigue additionally requiring a choice for an appropriate material to construct the offshore floater and the belonging vertical buoyancy columns and braces to prevent from fatigue of material.

According to a further advantageous embodiment of the present disclosure, an Offshore floater plant comprising a plurality of offshore floaters, according to any of the above embodiments, is constituted by offshore floaters of said plurality of offshore floaters that are coupled by means of flexible connections and in that at least the offshore floaters which are positioned at the corners of said Offshore (solar) floater plant are attached to the bottom of the sea. This means that not all the floaters are necessarily fixed to the sea bottom, but that it could be that only a selection of the floaters of the floater plant are connected to the sea bottom. For those floaters that will be connected to the sea bottom, these moored floaters will have minimum 1 anchor point to the sea bottom, meaning that they will not necessarily have 4 anchor points to the sea bottom. This can bring a significant cost saving and optimization of the offshore solar floater plant.

a. In this way, by coupling each of the offshore (solar) floaters to further offshore (solar) floaters, each of the respective floaters of the plurality of offshore (solar) floaters are positioned in such way that these offshore floaters are not able to drift away from the other offshore floaters while at least the offshore solar floaters located at corner of the said Offshore floater plant are attached to the bottom of the water in order to fix the plant at a predetermined location and furthermore keep distance between each of the offshore solar floaters of the an Offshore floater plant.

A further advantage of this configuration of the an Offshore floater plant is that the connections between the offshore floaters, i.e. mooring-lines are completely immersed and increases the viscous drag damping providing sufficient clearance for nearby passing boats or heavy weather conditions.

BRIEF DESCRIPTION OF THE DRAWINGS

The present disclosure will be further elucidated by means of the following description and the appended figures.

DETAILED DESCRIPTION

Figure 1:
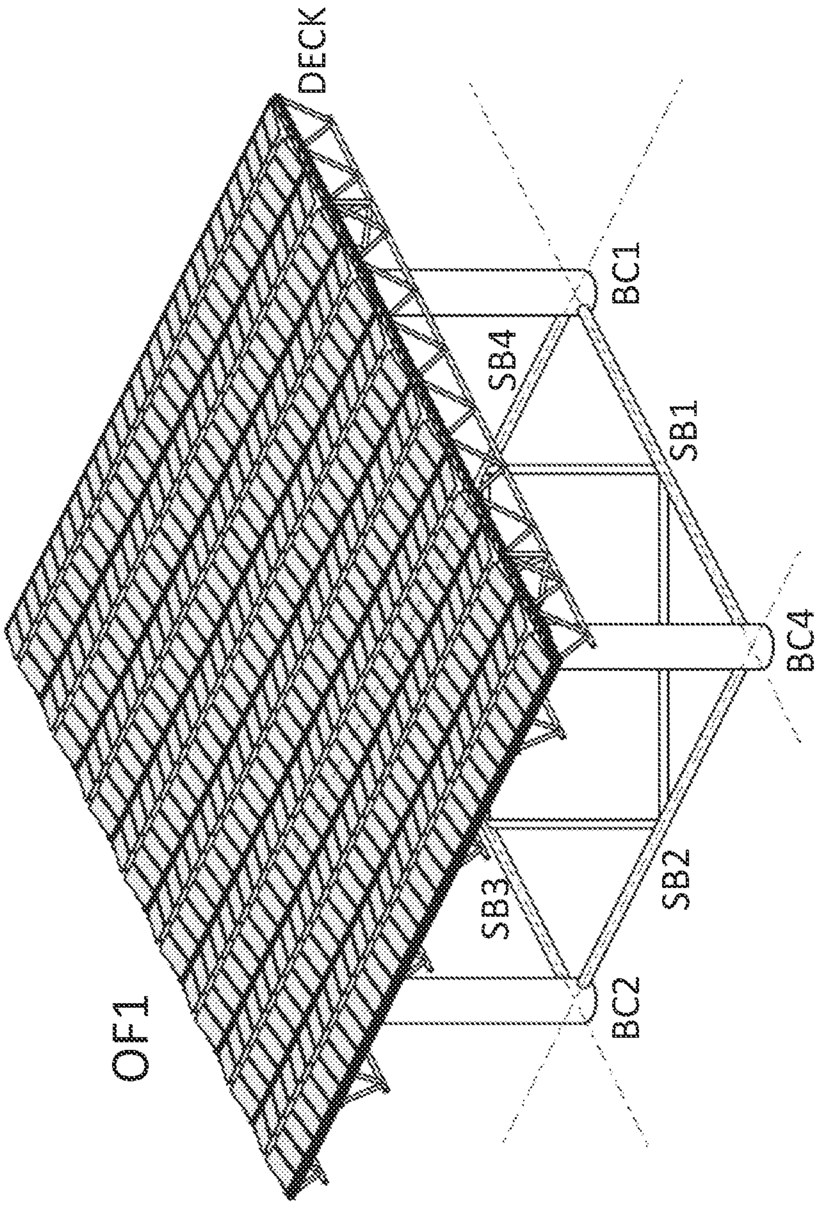
FIG. 1 shows an offshore solar floater comprising floaters, a top shelve and a frame.

The present disclosure will be described with respect to particular embodiments and with reference to certain drawings but the present disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the present disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the present disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the present disclosure described herein can operate in other orientations than described or illustrated herein.

The term “comprising”, used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression “a device comprising means A and B” should not be limited to devices consisting only of components A and B. It means that with respect to the present disclosure, the only relevant components of the device are A and B.

As the use of currently known floating solar plants in offshore conditions instead of in onshore conditions where such solar floaters are designed for, such use would cause such power plant mounted on a floater to be submerged in the water which causes damage to such power plant.

In the following an offshore solar floater according to embodiments of the present disclosure, overcoming these problems is disclosed.

In the following paragraphs, referring to the drawing in FIG. 1, an implementation of an offshore solar floater according to an embodiment of the present disclosure is described. In a further paragraph, an offshore solar power plant OFP comprising a plurality of offshore solar floaters OF1, . . . ,OFX; including all connections CL between mentioned elements an offshore solar floater are defined as shown in FIG. 2.

Such an offshore floater for positioning a deck above sea-level, comprising a floating structure for providing sufficient buoyancy to said offshore solar floater for positioning a deck (topside) above sea-level so that a load positioned on such deck is not submerged by waves of water. The offshore (solar) floater further may consist of a deck or topside for positioning a load such as Photo Voltaic solar energy panels where the meant deck is being coupled or attached to the floating structure.

According to an advantageous embodiment of the present disclosure such floating structure comprises a plurality of vertical buoyancy columns BC1, BC2, BC4 (BC3 is not shown) positioned at extremities of said floating structure, being positioned in a vertical configuration relative to the water or in other words, perpendicular to the sea surface during calm sea-conditions.

Figure 2:
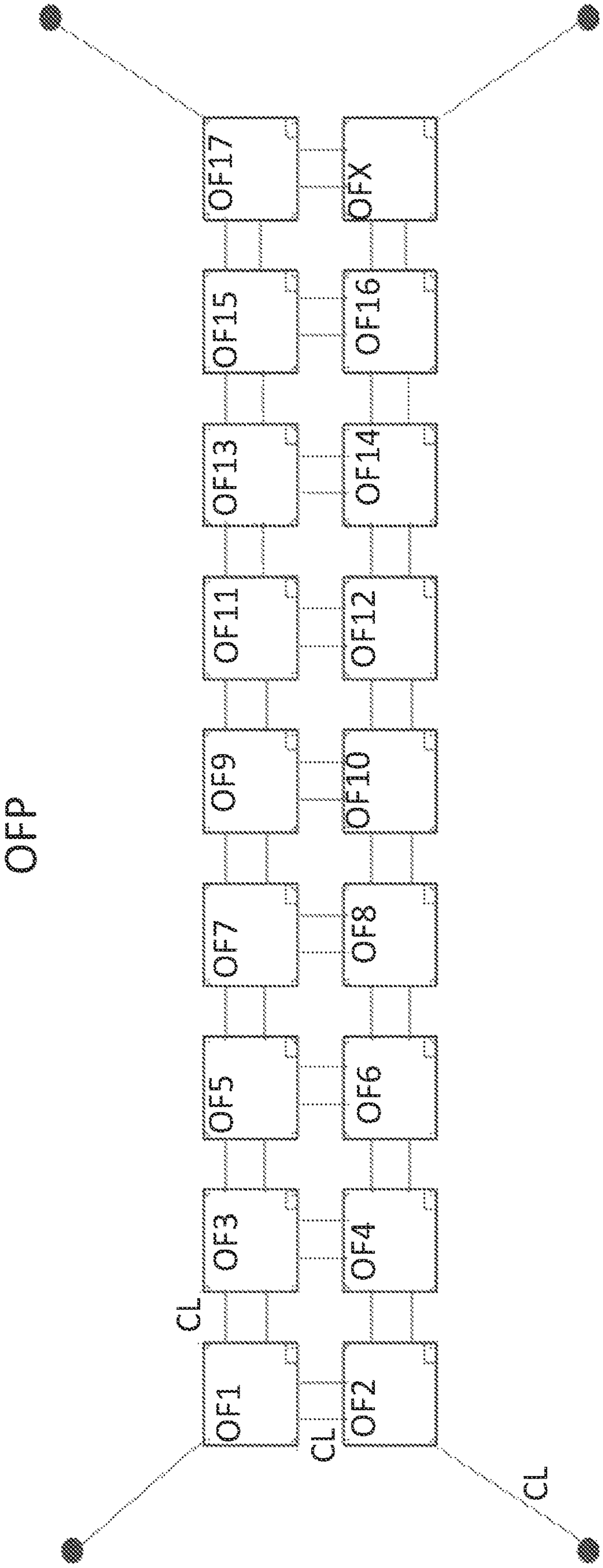
FIG. 2 shows an offshore solar power plant comprising a plurality of offshore solar floaters, with the offshore solar floaters connected to each other with flexible connections.
Figure 3:
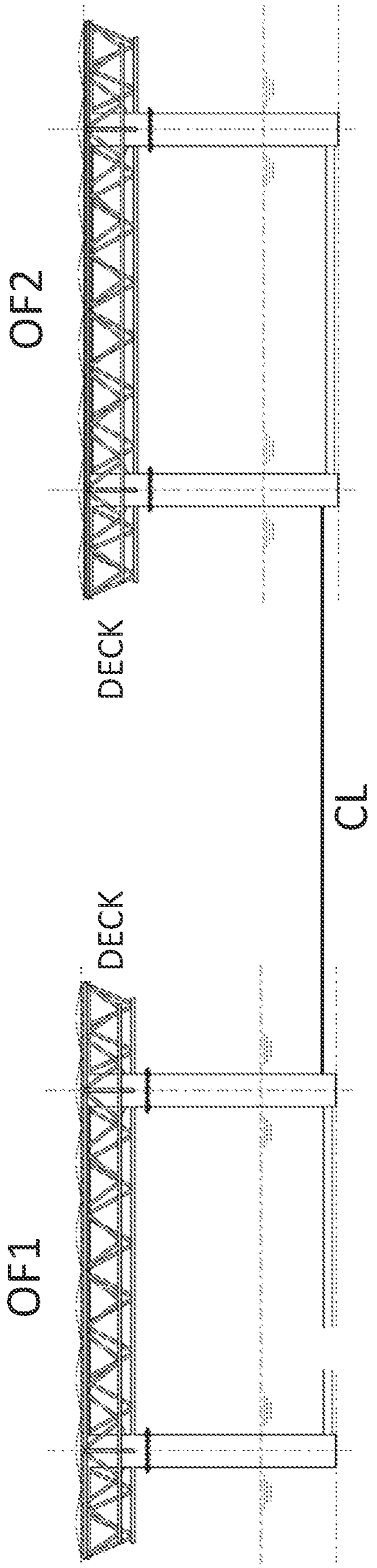
FIG. 3 shows a side view of the offshore solar floaters with flexible connections between offshore solar floaters of an offshore solar plant.

The floating structure as presented in FIG. 1 comprises 4 vertical buoyancy columns positioned on the four extremities of said floating structure in order to obtain an optimum stability of such offshore solar floater.

The vertical buoyancy columns BC1, BC2, BC4 typically have a vertical cylindrical shape. Possibilities also exist for placing a horizontal shaped element at the bottom of the vertical buoyancy column to dampen vertical movements of the floater.

The floating structure is dimensioned such that the deck of the offshore solar floater is positioned sufficiently high not to be submerged with water.

The volume of the part of the plurality of vertical buoyancy columns BC1, BC2, BC4 submerged in the water needs to be dimensioned in such manner that this volume provides with sufficient buoyancy for maintaining the required clearing distance, i.e. the distance between the deck and water surface and or the top of the waves.

In order to obtain sufficient buoyancy for the offshore floater OF1, the length of each said vertical buoyancy column may lie in a range between 4 and 25 m, preferably between 10 and 25 m, more preferably between 10 and 20 m.

The diameter of such vertical buoyancy column BC1, BC2, BC4 is to be dimensioned in function of the material used, to be able to be obtain sufficient clearance distance for the solar panels position on the deck of the floater.

According to an embodiment of the present disclosure the length of said deck lies in a range between 25 and 75 m, and preferably between 30 and 60 m, more preferably between 34 and 40 m and a width of said deck lies in a range between 25 and 75 m, and preferably between 30 and 60 m, more preferably between 34 and 40 m.

Such a deck of a floater according to embodiments of the present disclosure could provide space for at least 300 solar panels on one single floater, but possibly substantially more.

For instance, a deck of 35×35 meter deck could allow to position approximately 450 solar panels.

The deck of such offshore floater extends up to 5 meters horizontally beyond the said floating structure. The effect of this is that the available surface area doubles, making it possible to install twice as much solar panels as without the extension beyond the said floating structure. This brings a huge advantage in terms of solar panel installed capacity for a given offshore floater OF1.

An Offshore floater plant OFP is constituted by offshore floaters that are coupled to each other by means of flexible connection lines CL (such as mooring lines). These flexible connections lines enable the offshore floater to benefit from freedom of motion, however keeping the same average horizontal position. These flexible connection lines enable a vertical freedom of motion in function of the wave environment. This freedom of motion is also permitted by the fact that the offshore floaters are positioned at some distance from each other. This freedom of motion makes that the loads between each floater are very much reduced, compared to floaters with rigid connections where these floaters have to follow the movements of the neighboring floaters besides its own loads induced by the waves, such a floater cannot follow the movements of the waves independently, thus inducing high and complex loads, making these rigid connections very critical and subject to these high and complex loads.

In the situation of rigid connections, these rigid connections would have to be located at or near the deck or in the upper part of the floater. Another advantage of the choice of flexible connections lines between floaters together with sufficient distance between each floater, is that no such high or dynamic loads are applied on the deck and that this deck can therefore be extended beyond the said offshore floater. As is further explained in this document, the possibility to extend the deck beyond the said offshore floater brings a huge advantage in terms of increased available space per offshore floater and thus increased installed capacity of PV solar panels per offshore floater, and thus in terms of cost competitiveness potential.

As a consequence the floating structure of such offshore floater is elevated at least 1,5 m over the over the sea level, including selected extreme waves for guaranteeing a required clearance distance, i.e. the distance between the deck and extreme water surface and or the top of the waves so that the load of the offshore solar floater, such as the PV solar panels not all are submerged by waves of water. The deck of the offshore solar floater could be emerging 9 m or more above still sea level, without considering marine growth at end of operational life.

By positioning each of the plurality of vertical buoyancy columns on the outer extremities of said floating structure where these vertical buoyancy columns are further positioned in a vertical configuration relative to the water, the stability characteristics of the floater and hence the stability of the offshore solar floater has increased significantly, due to the fact that the buoyancy is more distributed towards the extremities of the floater structure.

The buoyancy being distributed towards the extremities of the floater structure means that the distance between the centre of such floater and the buoyancy columns is as large as possible. The distance between the centre of such floater and a corner of such floater where such corner is constituted by a vertical buoyancy column is largest. By positioning such vertical buoyancy columns at the extremities of such floater the stability of such floater is optimum.

A floater with a more uniform or more centred buoyancy distribution, e.g. comprising vertical buoyancy columns on the inner part of such floater, or in between vertical buoyancy columns at respective corners, offers less stability compared to a floater with a more buoyancy distribution towards the extremities.

In designing such a floating structure, the number of vertical buoyancy columns is, amongst others, a trade-off between the buoyancy of the floating structure and cost as a consequence of the amount of material used in addition to the production costs.

The floating structure further comprises a plurality of structural braces SB1, SB2, SB3, and SB4 between said vertical buoyancy columns of said plurality of vertical buoyancy columns for providing structural integrity of said floating structure. In FIG. 1 it is shown that at least between each of the four vertical buoyancy a structural brace or frame is coupled columns for providing structural integrity to the offshore solar floater.

Structural braces SB1 is connected between vertical buoyancy columns BC1 and BC4, Structural braces SB2 is connected between vertical buoyancy columns BC2 and BC4, Structural braces SB3 is connected between vertical buoyancy columns BC2 and BC3, and Structural braces SB4 is connected between vertical buoyancy columns BC1 and BC3.

In embodiments of the present disclosure the plurality of structural braces between said vertical buoyancy columns of said plurality of vertical buoyancy columns are positioned substantially horizontal or diagonally if so required.

The primary function of the structural braces is to ensure structural integrity. By using smaller diameters for the structural braces than for the buoyancy columns, it is ensured that the floater buoyancy is concentrated in the vertical buoyancy columns rather than in the structural braces, and that the floater thereby has a buoyancy distributed towards the extremities ensuring a better stability, as explained above.

An offshore (solar) floater OF1 according to embodiments of the present disclosure further comprises a deck for positioning a load such as PV solar energy panels.

On the top side of the offshore solar floater, the vertical buoyancy columns are coupled, to the deck of the offshore floater providing with further structural stability of the floating structure.

In embodiments of the present disclosure the deck or topside of the offshore solar floater extends beyond said floating structure resulting in an enlarged space for positioning the load such as PV solar panels on top the deck of the offshore (solar) floater.

This brings the advantage of maximizing the deck surface area available for installation of solar panels for a given floater unit, and thereby optimizes the electricity production per given floater unit. This is one of the elements making that the floater is a large-scale solar panel floater.

The floating structure comprising these vertical buoyancy columns and the structural braces may be produced using concrete, steel, aluminium, Fibre reinforced plastic FRP, Glass reinforced plastic GRP, composite, other suitable materials or a combination thereof.

The use of concrete and steel will provide with a floating structure which has a higher weight requiring dedicated dimensions to fulfil requirements with respect to vertical clearance of the offshore solar floater but will be less susceptible of physical damage due to mechanical impacts.

The use of Fiber reinforced plastic FRP contrary to steel and concrete provides with a much lighter floating structure requiring dedicated dimensions to fulfil requirements and requiring less material in order to fulfil requirements with respect to the vertical clearance of the offshore solar floater.

A further essential element of eembodiments of the present disclosure are enabled to accommodate offshore environment conditions, including continuous wave loads inducing fatigue additionally requiring a choice for an appropriate material to construct the offshore floater and the belonging vertical buoyancy columns to prevent from fatigue of material. The choice of material is essentially for preventing fatigue in material of a floater according to embodiment of the present disclosure.

A still further advantageous feature of the present disclosure is that the offshore (solar) floater on the exterior of said floating structure of said offshore solar floater at least partially is covered with an anti-corrosion coating. By covering the elements of the floating structure, i.e. the vertical buoyancy columns and the structural braces at least partially, e.g. the submerged part thereof the lifecycle of the floating structure will extend.

Further embodiments of the present disclosure is that the load of the offshore (solar) floater comprises at least one PV solar panel.

Further embodiments of the present disclosure is that the load of the offshore (solar) floater comprises a large amount of PV solar panels. Such an extended deck of a floater according to embodiments of the present disclosure could provide space for up to 300 solar panels or possibly more on one single floater.

According to another embodiment of the present disclosure the offshore floater, said offshore solar floater may include power conversion system for delivering and evacuating the generated electrical current, such as solar inverters and transformers and/or batteries, which needs to be protected against contact with sea water to prevent from damage due the sea water.

Another advantageous embodiments of the present disclosure is that the plurality of PV solar panels are positioned in a triangular wave shaped roof set-up wherein a first selection of the panels is positioned in a first direction and a second selection in a second direction as is shown in FIG. 1. Other PV solar panels configurations can also be possible.

A further advantageous embodiment of the present disclosure is an offshore floater plant that comprises a plurality of offshore floaters according to any of the embodiments herein, wherein the offshore floater plant is constituted by offshore floaters of said plurality of offshore floaters which are coupled by means of a flexible connections. As is shown in FIG. 2, each Offshore floater is coupled to an adjacent Offshore floater with a least one flexible connection In FIG. 2 it is, as an example only, shown that each adjacent Offshore floater are connected to each other by 2 flexible connections. These connections may be connection mooring lines.

Furthermore, the offshore floaters of the offshore floater plant which are positioned at the corner of said offshore (solar) floater plant are connected/fixed to the bottom of the water.

In this way, by coupling each of the offshore floaters to a further offshore (solar) floaters, each of the respective floaters of the plurality of offshore (solar) floaters are positioned in such way that these offshore floaters are not able to drift away from the other offshore (solar) floaters while at least the offshore solar floaters located at corner of the said Offshore (solar) floater plant are connected/fixed to the bottom of the water in order to fix the plant at a predetermined location and furthermore keep distance between each of the offshore solar floaters of the an Offshore (solar) floater plant. This means that not all the floaters are necessarily fixed to the sea bottom, but that it could be that only a selection of the floaters of the floater plant are connected to the sea bottom. For those floaters that will be connected to the sea bottom, these moored floaters will have minimum 1 anchor point to the sea bottom, meaning that they will not necessarily have 4 anchor points to the sea bottom. This can bring a significant cost saving and optimization of the offshore solar floater plant.

A further advantage of this configuration of the an Offshore floater plant is that the connections between the offshore floaters, i.e. mooring-lines completely immersed increases the viscous drag damping providing sufficient clearance for nearby passing boats. In embodiments of the present disclosure, floating solar platforms are positioned in an array at some distance from each other, not right next to each other. This allows for more freedom of movement of each floater, and also allows easier connections, with less complex loads. An additional advantage of this embodiment is that also the environmental footprint in terms of area coverage over water surface blocking sunlight to reach the water, is minimized.

In other words, based on an air gap and interdistance between different floaters, this concept has a good chance to limit ecosystem impact since sunlight capture from the water is limited compared to other concepts.

The invention claimed is:

1. An offshore floater for a plurality of solar panels, the offshore floater comprising:

a floating structure for providing buoyancy to the offshore floater; and a deck for mounting the plurality of solar panels, the deck being supported by the floating structure, wherein the floating structure comprises:

a plurality of vertical buoyancy columns positioned at corners of the floating structure; and a plurality of structural braces connecting the plurality of vertical buoyancy columns for providing structural integrity of the floating structure wherein said plurality of structural braces are configured not to provide buoyancy to the floating structure, wherein the plurality of structural braces are positioned along an outer perimeter of the floating structure; and wherein a length of each of the plurality of the vertical buoyancy columns lies in a range between 4 and 25 meters.

2. The offshore floater according to claim 1, wherein the plurality of structural braces between the plurality of vertical buoyancy columns are positioned substantially horizontal.

3. The offshore floater according to claim 1, wherein the deck extends beyond the floating structure.

4. The offshore floater according to claim 1, wherein the floating structure is elevated at least 1.5 m over sea level including extreme wave, or could be emerging 9 m or more above still sea level.

5. The offshore floater according to claim 1, wherein a length of the deck lies in a range between 25 and 75 m.

6. The offshore floater according to claim 1, wherein the floating structure comprises the plurality of vertical buoyancy columns comprises concrete, steel, Glass reinforced plastic, Fiber reinforced plastic, aluminium, composite or a combination thereof.

7. The offshore floater according to claim 1, wherein an exterior of the floating structure of the offshore floater is covered with an anti-corrosion coating.

8. The offshore floater according to claim 1, wherein the deck is arranged for mounting the plurality of solar panels in a triangular wave shaped roof set-up.

9. The offshore floater according to claim 1, wherein the offshore solar floater at least comprises an electrical inverter for delivering and evacuating a generated electrical current.

10. An offshore floater plant, comprising a plurality of offshore floaters according to claim 1, wherein each of the plurality of offshore floaters is coupled by means of flexible connections comprising a mooring line; and at least the plurality of offshore floaters positioned at the corner of the offshore floater plant are attached to the bottom of the water.

11. The offshore floater according to claim 1, wherein a length of each of the vertical buoyancy columns lies in a range between 10 and 25 meters.

12. The offshore floater according to claim 1, wherein a length of each of the vertical buoyancy columns lies in a range between 10 and 20 meters.

13. The offshore floater according to claim 2, wherein the deck extends beyond the floating structure.

14. The offshore floater according to claim 2, wherein the floating structure is elevated at least 1.5 m over sea level including extreme wave, or could be emerging 9 m or more above still sea level.

* * * * *